(12) United States Patent
Humbert et al.

(10) Patent No.: US 11,619,913 B2
(45) Date of Patent: Apr. 4, 2023

(54) COMPUTER-IMPLEMENTED METHOD AND SYSTEM FOR DIAGNOSING MECHANICAL DEFAULT OF A MECHANICAL WATCH, AND MECHANICAL WATCH FOR IMPLEMENTING SAID METHOD

(71) Applicant: INVOXIA, Issy les Moulineaux (FR)

(72) Inventors: Éric Humbert, Boulogne Billancourt (FR); Arthur Belhomme, Paris (FR)

(73) Assignee: INVOXIA, Issy les Moulineaux (FR)

( * ) Notice: Subject to any disclaimer, the term of this patent is extended or adjusted under 35 U.S.C. 154(b) by 807 days.

(21) Appl. No.: 16/540,236

(22) Filed: Aug. 14, 2019

(65) Prior Publication Data

US 2020/0057414 A1 Feb. 20, 2020

(30) Foreign Application Priority Data

Aug. 14, 2018 (EP) ..................... 18306118

(51) Int. Cl.
| | | |
|---|---|---|
| *G04D 7/06* | (2006.01) | |
| *G04D 7/00* | (2006.01) | |
| *G06N 3/04* | (2023.01) | |
| *G06N 3/08* | (2023.01) | |

(52) U.S. Cl.
CPC ............. *G04D 7/006* (2013.01); *G04D 7/00* (2013.01); *G06N 3/04* (2013.01); *G06N 3/08* (2013.01)

(58) Field of Classification Search
CPC ............. G04D 7/006; G06N 3/04; G06N 3/08
USPC ........................................................ 706/12
See application file for complete search history.

(56) References Cited

U.S. PATENT DOCUMENTS

| | | | | |
|---|---|---|---|---|
| 3,690,144 | A | * | 9/1972 | Bonny ................. G04D 7/002 968/681 |
| 3,802,251 | A | * | 4/1974 | Durr ..................... G04D 7/007 968/755 |
| 2015/0322924 | A1 | * | 11/2015 | Menasanch De Tobaruela ........... F03D 1/06 73/660 |
| 2016/0071383 | A1 | * | 3/2016 | Baldwin ................ G06F 3/011 340/407.1 |
| 2017/0011210 | A1 | * | 1/2017 | Cheong ................. A61B 5/681 |
| 2017/0054463 | A1 | * | 2/2017 | Shih ...................... G06F 3/0433 |
| 2017/0206718 | A1 | * | 7/2017 | Kapoor ................. G07C 5/0808 |
| 2018/0074593 | A1 | * | 3/2018 | Dibbur ................. G06F 3/014 |
| 2019/0250567 | A1 | * | 8/2019 | Wang ..................... G04R 20/28 |
| 2021/0200157 | A1 | * | 7/2021 | Jornod .................. G04D 7/006 |
| 2021/0345913 | A1 | * | 11/2021 | Humbert ............. A61B 5/4088 |

(Continued)

FOREIGN PATENT DOCUMENTS

| | | |
|---|---|---|
| CN | 103245524 A | 8/2013 |
| CN | 103969046 A | 8/2014 |

(Continued)

OTHER PUBLICATIONS

European Search Report Application No. EP 18306118.3 dated Mar. 19, 2019.

*Primary Examiner* — April G Gonzales
(74) *Attorney, Agent, or Firm* — von Briesen & Rope, s.c.

(57) ABSTRACT

A computer-implemented method for diagnosing mechanical default of a mechanical watch, wherein at least one vibration signal is acquired from the mechanical watch the vibration signal is analyzed by an artificial intelligence trained to detect mechanical default in mechanical watches to determine a diagnosis whether the mechanical watch is working properly or not.

15 Claims, 6 Drawing Sheets

(56) References Cited

U.S. PATENT DOCUMENTS

2021/0406862 A1* 12/2021 Humbert .............. G06Q 20/208
2022/0109992 A1* 4/2022 Humbert ............. H04W 12/106

FOREIGN PATENT DOCUMENTS

| CN | 107861367 A | 3/2018 |
| EP | 2753986 A1 | 7/2014 |
| EP | 3330811 A1 | 6/2018 |

* cited by examiner

COMPUTER-IMPLEMENTED METHOD AND SYSTEM FOR DIAGNOSING MECHANICAL DEFAULT OF A MECHANICAL WATCH, AND MECHANICAL WATCH FOR IMPLEMENTING SAID METHOD

CROSS-REFERENCE TO RELATED APPLICATION

This application claims priority under the Paris Convention to European Patent Application too, 18306118.3 filed on Aug. 14.

FIELD OF THE INVENTION

The present invention refers to methods and systems for diagnosing mechanical default of a mechanical watch and mechanical watches for implementing said methods.

BACKGROUND OF THE INVENTION

A mechanical watch is used to evaluate and measure the time. The precision with which the time is displayed by the watch depends on the quality of the watch. Several factors can lead to a bad precision.

In particular, the bad precision can be due to a mechanical default of the watch. The mechanical default includes for example a fatigue of the mechanical elements of the watch or a bad level of tension of the spring of the mechanical watch, or a tightness default of the casing of the watch.

Actually, the methods for detecting such mechanical default of a watch are based on the chronometry of the watch. In such methods, characteristic parameters, such as the rate, the beat and the amplitude of the watch is extracted from acoustic signals. The beat, the rate and the amplitude are respectively limited to extreme values between which the values of the parameters indicates a normal functioning of the watch. The characteristics parameters are measured repeatedly and compared with the extreme values.

The characteristic parameters of the watch to be tested have to be known prior to the detection of the default. Moreover, the extreme values have to be fixed. Finally, the measures of the characteristic parameters have to be made several times and repeatedly to detect a default.

It follows that the actual methods are time consuming and have to be supervised by someone.

Document U.S. Pat. No. 3,802,251 describes a method for detecting tightness default of a watch. The watch is placed in a pressure chamber and subjected to an air pressure which differs from atmospheric air pressure. Then, a tightness default is detected if there is a change in the accuracy of the operation of the watch movement. Such change in the accuracy can be detected for example by placing a microphone arranged to receive acoustic oscillations of the watch movement and to convert these acoustic oscillations into electric signals to obtain a chronograph. The change in the accuracy can then be read on the chronograph.

Then it appears that the detection of tightness default requires a particular installation including a pressure chamber. Moreover, such method can be destructive for the watch if the watch presents a tightness default.

The present invention aims to improve the present situation.

OBJECTIVES AND BRIEF DESCRIPTION OF THE INVENTION

According to a first aspect, the object of the invention is a computer-implemented method for diagnosing mechanical default of a mechanical watch, wherein at least one vibration signal is acquired from the mechanical watch and said vibration signal is analyzed by an artificial intelligence trained to detect mechanical default in mechanical watches to determine a diagnosis whether said mechanical watch is working properly or not.

A default of the watch can then be detected very quickly by acquiring a single vibration signal. Moreover, the detection of a default does no need a particular installation such as a pressure chamber. The method according to the invention is then very efficient and easy to use, with no need of supervision.

According to an embodiment, the artificial intelligence is a neural network, the method further comprising a prior learning step comprising:

acquiring a plurality of vibration signals from mechanical watches with no default and from mechanical watches presenting a default, indicating which vibration signals are obtained from mechanical watches presenting a default, training the neural network until it converges, storing said neural network.

Then, the model for training the neural network can be easily obtained by acquire vibration signals of a plurality of watches.

According to an embodiment, the learning step further comprises an indication of a model of the mechanical watch from which said at least one vibration signal is acquired, said neural network being trained to detect mechanical default according to the model of the mechanical watch.

This allows to obtain a much more robust neural network. Indeed, the more precise is the neural network, the more precise will be the detection of a default of a mechanical watch.

According to an embodiment, at least one vibration signal is generated by a timepiece mechanism of said mechanical watch.

This allows to detect a default of the mechanical watch mechanism. The default can be due to a fatigue of the mechanical elements of the watch or a bad level of tension of the spring of the mechanical watch.

According to an embodiment, at least one vibration signal is generated by propagation of an exciter signal in a casing of the mechanical watch.

This allows to detect a default of the casing of the mechanical watch. Such default can for example be a tightness default.

According to an embodiment, the exciter signal is generated by one of:

shocking the mechanical watch with an external mechanical element, exciting a piezo electrical element being in contact with the mechanical watch.

Then, it appears that no particular installation is needed to detect a tightness default of the casing of the watch. There is no risk of damaging the mechanical watch. Moreover, the process to generate a vibration signal from which a tightness default can be detected is very simple.

According to an embodiment, the artificial intelligence is trained to detect a mechanical default of the mechanical watch, chosen between at least:

a mechanical default of a timepiece mechanism of the mechanical watch and/or a tightness default of a casing of the mechanical watch.

Then, the method allows to detect two types of defaults by only training a single artificial intelligence. The ergonomics of the method is then improved. Moreover, the time consumption for training the neural method and detecting a default is greatly reduced.

According to an embodiment, the method further comprises a communication step during which the diagnosis is transmitted by a communication interface.

Then, a user wishing to known if his watch presents a default can receive the diagnosing in real time.

The present invention also refers to a system for diagnosing mechanical default of a mechanical watch comprising:
- a vibration sensor able to acquire at least one vibration signal of the mechanical watch;
- a processor communicating with the vibration sensor and adapted to analyze said at least one vibration signal by an artificial intelligence trained to detect mechanical default in mechanical watches to determine a diagnosis whether said mechanical watch is working properly or not.

According to an embodiment, the vibration sensor and the processor belong to a diagnosing device which is distinct from the mechanical watch.

Then, to detect a default of the mechanical, the mechanical watch can be put on the diagnosing device.

According to an embodiment, the artificial intelligence includes a neural network trained to detect mechanical default in mechanical watches to determine a diagnosis whether said mechanical watch is working properly or not, and wherein the diagnosing device further comprises a storage module storing said neural network.

Then, once the neural network has been trained, it is possible to store it forever. It reduces the time lapse between the acquiring of a vibration signal and the obtaining of the diagnosis. Indeed, the communications According to an embodiment, the diagnosing device further comprises a communication interface communicating with the processor, the processor being configured to send the diagnosis through the communication interface.

Then a user of the mechanical watch can receive the diagnosis.

According to an embodiment, the system further comprises a server, remote from the vibration sensor, the server comprising the processor.

Then the storage of the artificial intelligence can be remote. In an embodiment, a plurality of diagnosing device communicates with the server to detect default of mechanical watch.

According to an embodiment, the system further includes the mechanical watch, wherein at least the vibration sensor belongs to the mechanical watch.

At least a part of the system can be embedded in the mechanical watch. Then, the mechanical watch itself can detect its default.

The present invention also refers to a mechanical watch comprising:
- a vibration sensor able to acquire at least one vibration signal of the mechanical watch;
- a processor communicating with the vibration sensor and adapted to analyze said at least one vibration signal by an artificial intelligence trained to detect mechanical default in said mechanical watch to determine a diagnosis whether said mechanical watch is working properly or not.

According to an embodiment, said artificial intelligence includes a neural network trained to detect mechanical default in said mechanical watch to determine a diagnosis whether said mechanical watch is working properly or not, and wherein said mechanical watch further comprises a storage module storing said neural network.

The embedded components allow the mechanical watch to detect its own default. Moreover, since the artificial intelligence is stored in the storage module, which is embedded in the mechanical watch, the diagnosis is made with no need of a communication step.

According to an embodiment, the mechanical watch further comprises an accelerometer, the vibration sensor being able to acquire the at least one vibration signal of the mechanical watch when a horizontal position and an immobility of the mechanical watch is detected by said accelerometer or to be in a sleep state in which the vibration signal does not acquire any vibration signal.

It allows to reduce the consumption of energy. Indeed, almost no energy is consumed while the mechanical watch is in the sleep state.

According to an embodiment, the mechanical watch further comprises a communication interface communicating with the processor, the processor being configured to send the diagnosis through the communication interface.

A user can then receive the diagnosis of the mechanical watch.

BRIEF DESCRIPTION OF THE DRAWINGS

Other features and advantages of the invention will become apparent during the following description of one of the embodiments thereof, given as a no limiting example, with reference to the attached drawings.

In the drawings.

Figure 1:
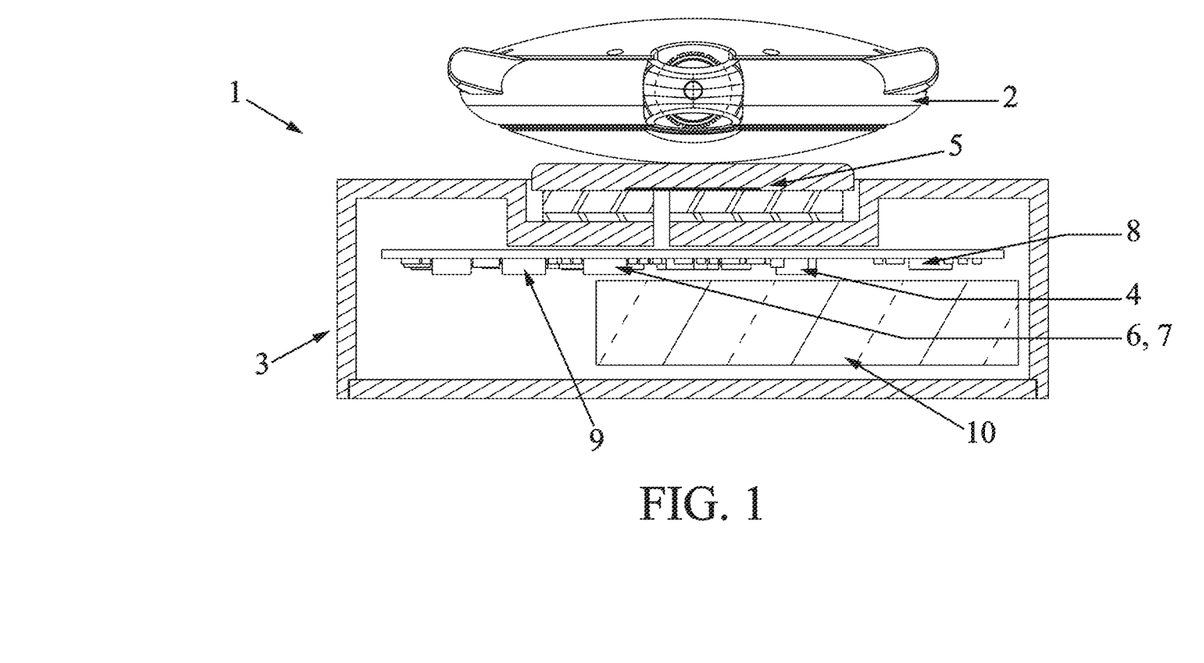
FIG. 1 shows a system for diagnosing a mechanical default of a mechanical watch according to an embodiment of the invention.

FIG. 1 illustrates a system 1 for diagnosing a mechanical default of a mechanical watch 2, or "watch 2". The mechanical watch 2 comprises a timepiece mechanism (not shown) that measures time.

In this embodiment, the diagnosing can be made by placing the watch 2 on a diagnosing device 3 of the system 1. The system 1 is then able to analyze a signal of the watch 2 to detect the presence of a default.

The system 1, according to the invention, is able to detect at least two different types of mechanical defaults of the watch 2.

First, it can detect a mechanical default of the mechanism of the watch, such as a fatigue of the mechanical elements of the watch or a bad level of tension of the spring of the mechanical watch. Second, it can detect a tightness default of the casing of the watch 2.

More precisely, the system 1 comprises a diagnosing device 3 and a processor 4. The diagnosing device 3, or "device 3", may comprise a vibration sensor 5. The vibration sensor 5 is able to acquire a vibration signal of the mechanical watch 2 when the watch 2 lays on the diagnosing device 3.

For example, for detecting a default of the mechanism of the watch, the vibration signal of the watch 2 may be the ticking sound produced by the mechanical watch's handle when it moves.

In the case of the detection of a tightness default of the watch, an exciting signal can be transmitted to the watch. The vibrations resulting from the propagation of the exciting signal in the watch correspond to the vibration signal.

The exciting signal can for example be generated by shocking the casing of the watch 2 with an external component.

Alternatively, the exciting signal is generated by exciting a piezoelectric element in contact with the casing of the watch 2.

The vibration sensor 5 can be an acoustic microphone, a piezoelectric microphone or an accelerometer.

In an embodiment, the piezoelectric microphone and the piezoelectric element used for generating an exciting signal are the same component.

In an embodiment of the invention, the vibration signal is the vibration of the air. The vibration of the air can be induced by the movement of the watch's handle or by the exciting signal propagating in the casing of the watch. In other words, the vibration signal is an acoustic signal of the watch 2.

Figure 3:
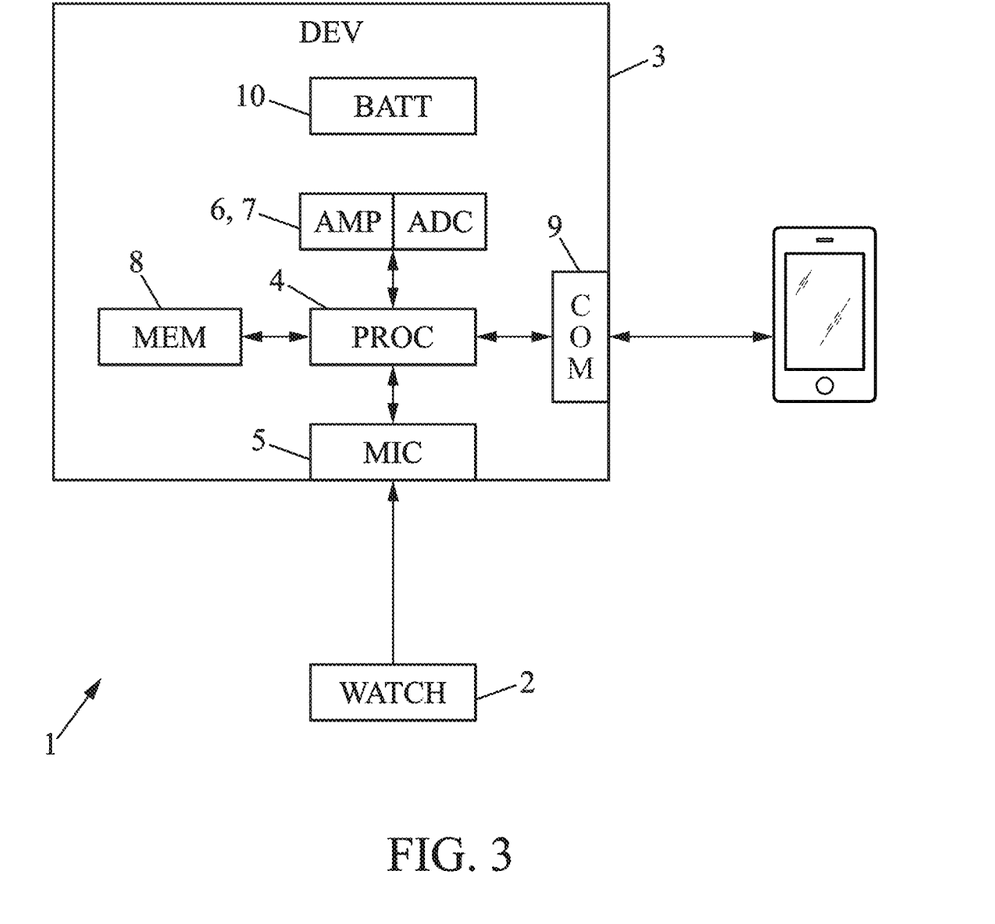
FIG. 3 is a block diagram of a system for diagnosing a mechanical default of a mechanical watch according to an embodiment of the invention.

In the embodiment illustrated in FIGS. 1 and 3, the vibration sensor 5 is an acoustic sensor such as a piezoelectric microphone or an acoustic microphone. The acquiring of acoustic signals by an acoustic sensor increases the precision of the acquired signal. It then increases the precision of the diagnosis.

For example, in the embodiment where the vibration signal is acquired by placing the watch 2 on the device, the vibration sensor may be a piezoelectric sensor, to limit the external noises in the acquired vibration signal.

The vibration sensor 5 may be able to communicate with the processor 4 to transmit the acquired vibration signal to it. The processor 4 analyses the vibration signal by an artificial intelligence trained to detect mechanical default in watches to determine a diagnosis whether said watch is working properly or not.

In an embodiment, the artificial intelligence may analyze the raw vibration signals. In another embodiment, the artificial intelligence may analyze processed vibration signals.

In particular, the device 3 may also comprise an amplifier 6. The amplifier 6 amplifies the vibration signal to obtain a more robust signal. The device 3 may also comprise an analog to digital converter 7 to convert the vibration signal into a numeric signal. The numeric signal can then be send to the processor 4 for analysis.

In another embodiment, the raw vibration signal can be modified in a representation of time/frequency signal called a spectrogram.

The processor 4 is then able to analyze the numeric signal, or raw vibration signal, and/or the spectrogram.

The device 3 may comprise a storage module 8. The storage module 8 can for example store the vibration signals of the watch 2, the numeric signals and the results of the diagnosis.

The device may also comprise an energy storage module 10 such as a battery.

The device 3 may also comprise a communication interface 9 able to communicate the results of the diagnosis to a communication device. The communication device may be a smartphone, a tablet or a computer. More precisely, the communication device may comprise a dedicated application through which the results are communicated to a user.

The communication interface 9 may be a wired interface, for example using USB ports, or a radio interface using a Wi-Fi, Bluetooth®, LORA®, SigFox® or NBIoT network. In another embodiment, it can also communicate using a 2G, 3G, 4G or 5G network.

The artificial intelligence is for example a neural network trained to detect mechanical default in watches to determine a diagnosis whether said watch is working properly or not.

The neural network can be a convolutional network. For example, the neural network is a single-layer neural network, a double-layer neural network or preferably at least a three-layer neural network.

The architecture of the neural network may depend of the inputs. For example, if the inputs are the raw vibration signals, the architecture may be a 1D-convolution architecture. In the case where the inputs are a spectrogram, it may be a 2D-convolution architecture. Finally when the inputs are complex, such as complex spectrograms, it may be a 3D-convolution architecture.

As a non-limiting example, the activation functions of the neural network may be of Rectified Linear Unit ("ReLU") type, except for the last layer for which an activation function such as a normalized exponential function (or "Softmax" function) can be used. Alternatively, the activation function can be a hyperbolic tangent function (or "tank") or a Parametric Rectified Linear Unit function (or "prelu").

Other architectures can also be used, such as full connected perceptron network, a Gated Recurrent Unit (or "GRU") network or Long Short-Term memory unit (or "LSTM") network.

The trained neural network may be comprised in the processor 4.

Alternatively, the trained neural network is stored in the storage module 8.

Figure 4:
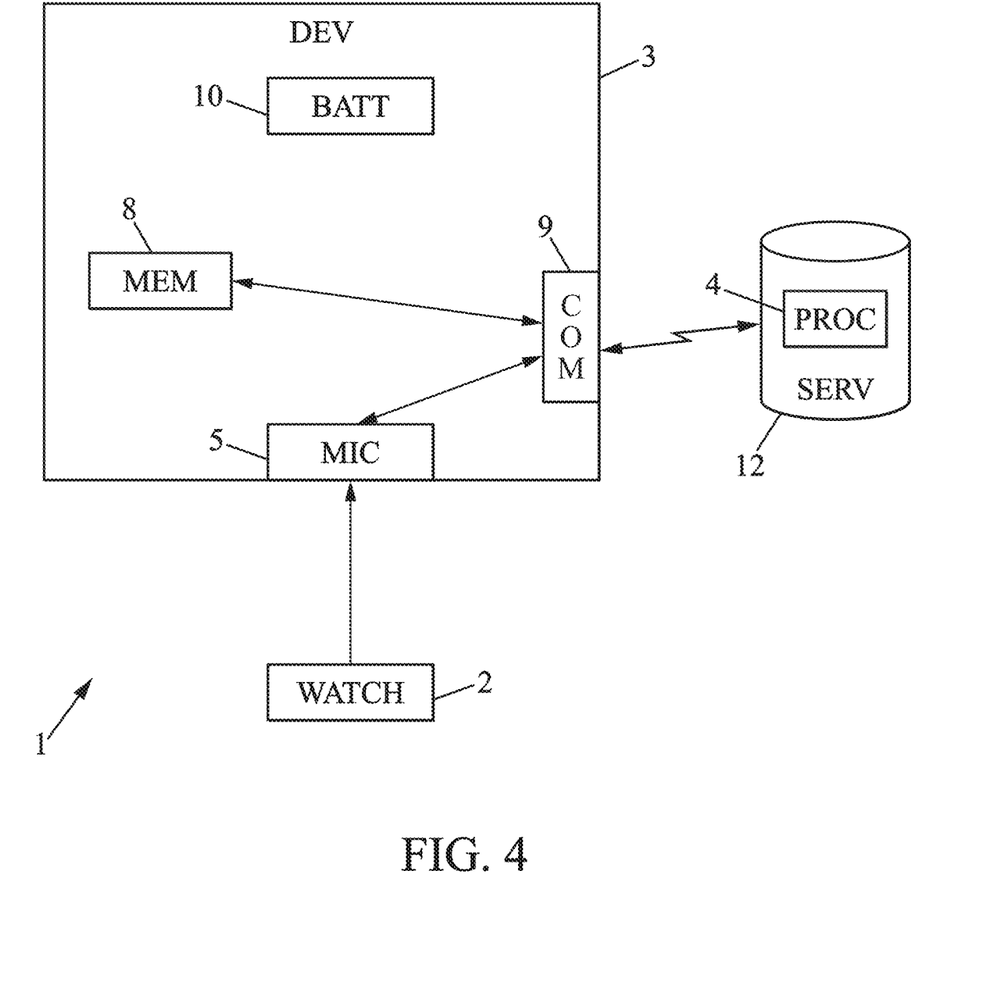
FIG. 4 is a block diagram of a system for diagnosing a mechanical default of a mechanical watch according to another embodiment of the invention.

In an alternative embodiment of the present invention, represented in FIG. 4, the processor 4 is not comprised in the device 3. The system 1 further comprises a remote server 12. By "remote" it is understood that the server 12 is not embedded in the device 3. In this embodiment, the server 12 comprises the processor 4, such that the artificial intelligence, or the neural network, is stored in the remote server 12.

The communication interface 9 may be able to send the vibration signals to the processor 4, and to receive the results of the diagnosis from the processor 4. In other words, the communication interface 9 may allow the communication between the device 3 and the remote server 12.

As another alternative, the neural network can be stored in the communication device.

Figure 2:
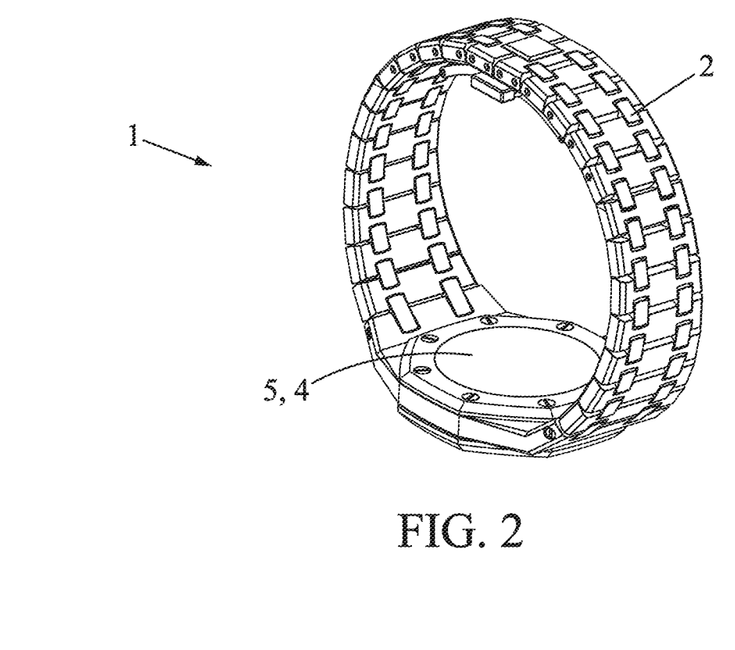
FIG. 2 shows a mechanical watch comprising an embedded system for diagnosing a mechanical default of the mechanical watch.
Figure 5:
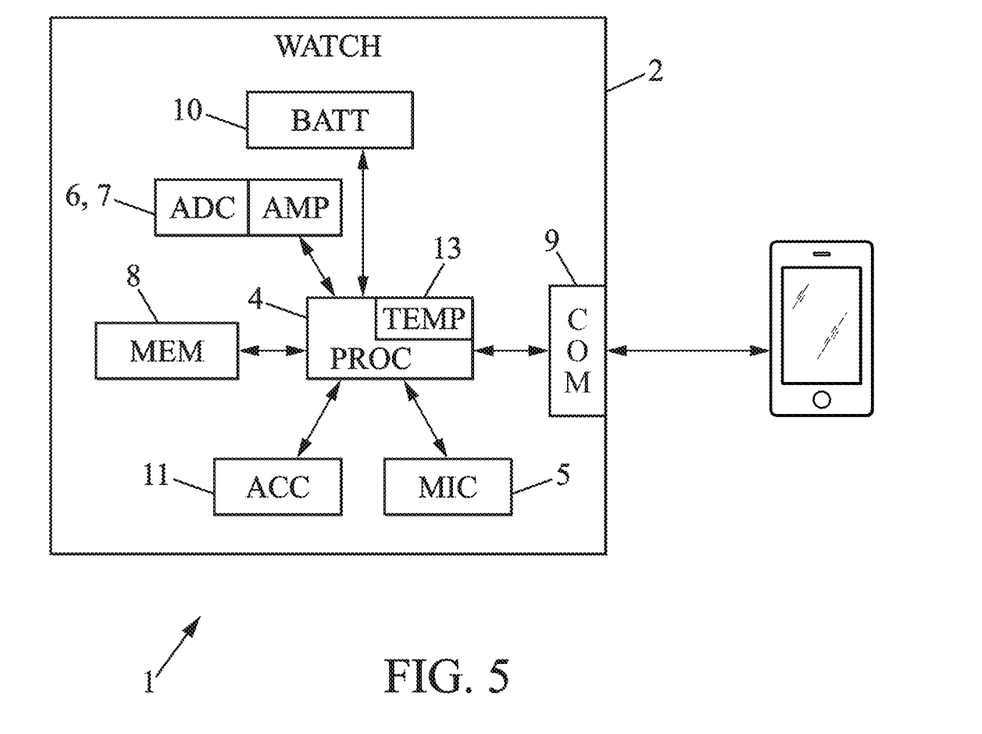
FIG. 5 is a block diagram of a system for diagnosing a mechanical default of a mechanical watch according to another embodiment of the invention, the system being embedded in a mechanical watch.

In an alternative embodiment of the invention, the mechanical watch 2 itself comprises means for diagnosing a mechanical default, as illustrated in FIGS. 2 and 5.

In particular, the components of the system 1 are miniaturized to be embedded in the watch 2.

In the following specification, the same references are used to designate the same components.

In other words, a system 1 for diagnosing a mechanical default of the watch is embedded in the watch 2 itself. For example, the system 1 is embedded in the casing of the watch 2.

In this embodiment, the watch 2 can comprise a vibration sensor 5. The vibration sensor may be an accelerometer, and piezoelectric sensor or a microphone.

The vibration sensor 5 may acquire vibration signals of the watch 2. More precisely, the vibration sensor 5 may acquire the signals induced by the vibration of the air due to the movement of the watch's handle.

The vibration sensor 5 may also acquire vibration signals induced by the propagation of an exciting signal in the casing of the watch 2, as described above.

For example, the vibration sensor 5 is a microelectromechanical microphone (or "MEMS microphone").

The watch 2 may also comprise an embedded processor 4 which communicates with the vibration sensor 5. The vibration signals acquired by the vibration sensor 5 are sent to the processor 4 which analyzes, by an artificial intelligence, the vibration signals to detect a mechanical default of the watch 2. As described in reference with FIGS. 1 and 3, the artificial intelligence may comprise a trained neural network.

As an alternative, the watch 2 may comprise a storage module 8 in which the trained neural network can be stored.

The watch 2 may also comprise an amplifier 6 and an analog to digital converter 7 to respectively amplify the vibration signals and convert it into numeric signals.

The watch 2 may also comprise an energy storage module such as a battery. The battery may be a rechargeable battery such as a photovoltaic battery. Then, the watch 2 may also comprise photovoltaic cells (not shown).

The watch 2 can also comprise a temperature sensor 13. In an embodiment of the invention, the temperature sensor 13 measures the temperature of the energy storage module 10. The measured temperature can then be sent to the processor 4 which determines the level of battery of the energy storage module 10.

In an embodiment of the invention, the temperature sensor 13 is comprised in the processor 4.

The watch 2 may also comprise an accelerometer 11 able to detect a horizontal position and an immobility of the mechanical watch 2. When such position is detected, the embedded system 1 can enter an activation mode during which the vibration sensor 5 acquires vibration signals of the watch 2. Otherwise, the embedded system is in a sleep mode during which no vibration signals are acquired or analyzed.

It then allows an economy of energy since no energy is spent during the sleeping mode. Moreover, the acquired signals are more robust when the watch is immobile in a horizontal position.

The acquired vibration signals can be stored in the storage module 8.

The watch 2 may also comprise a communication interface 9 able to send the results of the diagnosis to a communication device, such as described with reference to FIGS. 1 and 3. Preferably, the communication interface 9 is a radio interface using Bluetooth® or Wi-Fi.

For example, the results are transmitted to the communication device when the embedded system is in the activation state. Alternatively, the embedded system can enter in the activation state at each time interval to send the results of the diagnosis. For example, the embedded system goes into the activation state at least one time a day.

Figure 6:
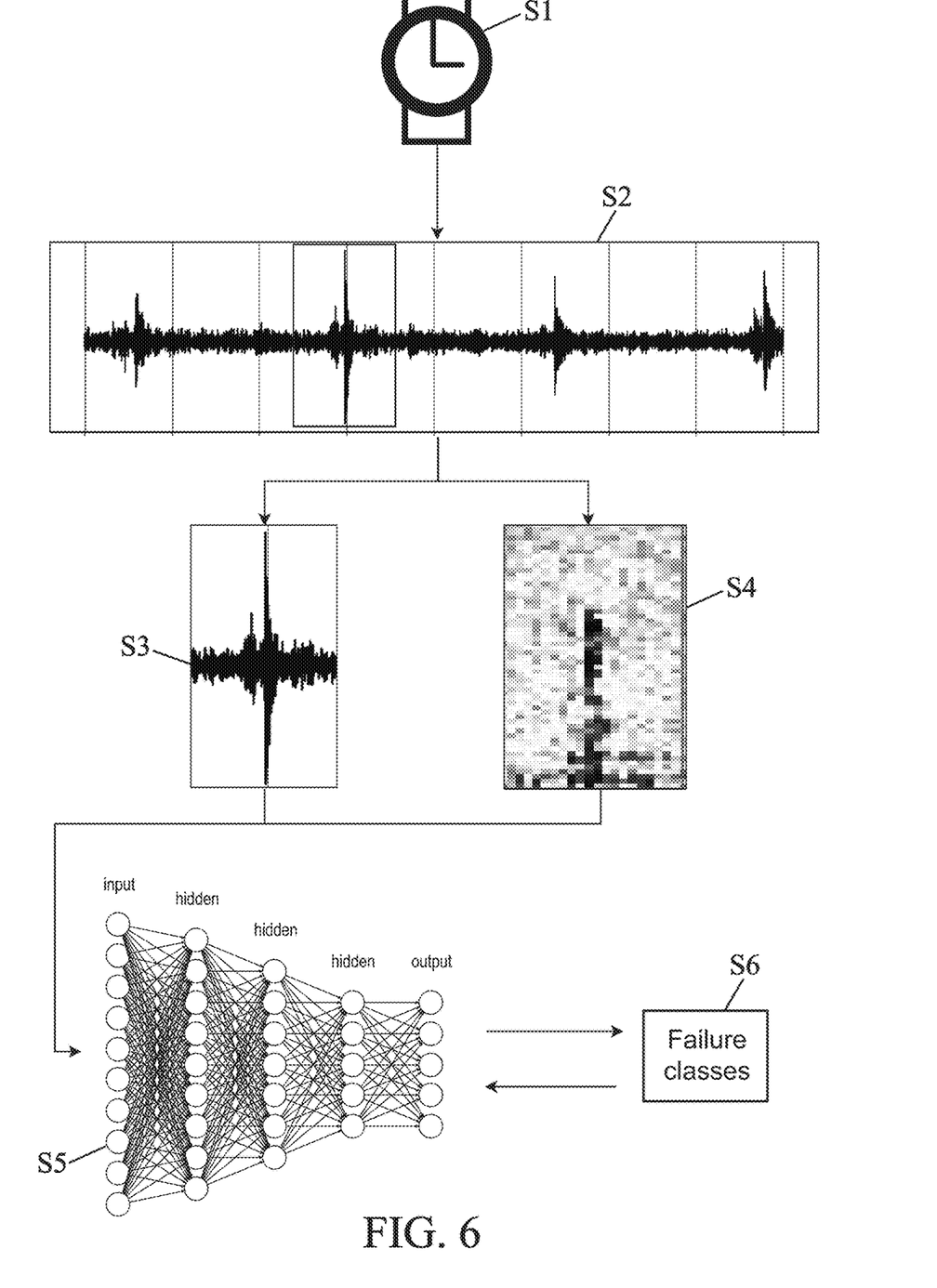
FIG. 6 illustrates the main steps of a training of a neural network for diagnosing a mechanical default of a mechanical watch according to an embodiment of the invention.

FIG. 6 illustrates the main steps of a method for training a neural network trained for diagnosing of a default of a mechanical watch and then diagnosing a mechanical watch.

The steps illustrated in FIG. 6 apply in the same way to all the embodiments described above in reference with FIGS. 1 to 5.

At the first step S1, at least one vibration signal of at least one mechanical watch is acquired by the vibration sensor 5.

In particular, the vibration signal of the watch can be an acoustic signal of the watch. The acoustic signal may correspond to the ticking sound of the mechanical watch, emitted by the movement of the watch's handle or to the propagation of an exciting signal in the casing of the watch.

For example, the vibration sensor 5 acquires the vibration signal during a plurality of seconds.

To train the neural network, a plurality of vibration signals is acquired from a plurality of functioning watches and from a plurality of mechanical watches presenting a mechanical default.

At step S2, the ticking sounds of the watches 2 are detected in the vibrations signals by localizing the maximum in the signal envelops, as illustrated at the second step S2.

This step S2 is repeated for each of the vibrations signals acquired at step S1.

Then, the vibration signals can be cut into a plurality of sub-signals, each centered on a maximum of the envelop, and each having the same size. The sub-signals are then normalized to obtain an audio descriptor of the vibration signal. A plurality of raw sub-signals is obtained at step S3.

Alternatively, the sub-signals are processed to obtain a plurality of spectrograms.

Since the vibration sensor 5 acquires a vibration signal during a plurality of seconds, a plurality of audio descriptors and/or spectrograms are obtained at step S3 for each watch.

Since steps S2 and S3 are repeatedly made for each watch, the number of data increases exponentially in a short time lapse. It allows enhancing the robustness of the neural network.

Each audio descriptor and/or spectrogram is labelled according to the state of the watch from which they have been acquired.

More precisely, the functioning watches are labelled as "functioning watches" whereas the watches presenting a default are labelled as "non-functioning watches". The audio descriptors and/or the spectrograms are labelled in the same way.

The labels can be converted into a numeric value and associated with the spectrograms and/or the audio descriptors corresponding respectively to the watch from which they have been acquired.

In another embodiment of the invention, the type of default of the watch is labelled. The default of the non-functioning watches may be known such that the watches are labelled according to their type of default.

As a non-limiting example, the labels can be "tightness default", "mechanical default", "spring default", . . . .

The labels can be converted into numeric value and associated with the spectrograms and/or audio descriptors corresponding respectively to the watch from which they have been acquired.

The neural network is then trained, at step S5, based on the labelled spectrograms and/or audio descriptors. In other words, the labelled spectrograms and/or audio descriptors correspond to the input of the neural network.

The neural network is trained to detect mechanical default, on the basis of the inputs. Once the neural network has converged, it is stored as well as the correspondence between the labels and the associated numerical values, at step S6.

In another embodiment, the watches can further be labelled according to their model. The model of the watch can be the brand of the watch. This can be use when the precision of the neural network is insufficient. The model of the watches can be known prior from the training. Alternatively, another neural network can be used to determine the model of the watch.

To proceed to the diagnosis of a mechanical watch, the above described steps S1 to S5 are applied.

More precisely, a vibration signal of the watch to be tested is acquired from a vibration sensor. The vibration signal is then cut into a plurality of sub-signals, each centered on the maximum of the envelop of the signal and each having the same size. The sub-signals can then serve as an input for the trained neural network. The sub-signals can also be converted into spectrograms to be used as an input for the trained neural network. The result of the diagnosis is then obtained as an output.

The results can then be delivered to a user through a communication device.

The method for diagnosing a default of the watch according to the invention allows obtaining a result of a diagnosis in a very short time lapse (less than a second) without any risk of damaging the watch. Moreover, the diagnosis can be made indifferently of the model and without knowing in advance characteristic parameters of the mechanical watch to be tested.

REFERENCES

System 1
Watch 2
Device 3
Processor 4
Vibration sensor 5
Amplifier 6
Analog to digital converter 7
Storage module 8
Communication interface 9
Energy storage module 10

The invention claimed is:

1. A computer-implemented method for diagnosing mechanical default of a mechanical watch, wherein at least one vibration signal is acquired from the mechanical watch and said vibration signal is analyzed by an artificial intelligence trained to detect mechanical default in mechanical watches, to determine a diagnosis whether said mechanical watch is working properly or not.

2. The method, according to claim 1, wherein the artificial intelligence is a neural network, the method further comprising a prior learning step comprising:
   acquiring a plurality of vibration signals from mechanical watches with no default and from mechanical watches presenting a default,
   indicating which vibration signals are obtained from mechanical watches presenting a default,
   training the neural network until it converges,
   storing said neural network.

3. The method, according to claim 2, wherein the learning step further comprises an indication of a model of the mechanical watch from which said at least one vibration signal is acquired, said neural network being trained to detect mechanical default according to the model of the mechanical watch.

4. The method according to claim 1, wherein said at least one vibration signal is generated by a timepiece mechanism of said mechanical watch.

5. The method, according to claim 1, wherein said at least one vibration signal is generated by propagation of an exciter signal in a casing of the mechanical watch.

6. The method according to claim 1, wherein the artificial intelligence is trained to detect a mechanical default of the mechanical watch, chosen between at least:
   a mechanical default of a timepiece mechanism of the mechanical watch and/or
   a tightness default of a casing of the mechanical watch.

7. The method, according to claim 1, further comprising a communication step during which the diagnosis is transmitted by a communication interface.

8. A system for diagnosing mechanical default of a mechanical watch comprising:
   a vibration sensor able to acquire at least one vibration signal of the mechanical watch;
   a processor communicating with the vibration sensor and adapted to analyze said at least one vibration signal by an artificial intelligence trained to detect mechanical default in mechanical watches to determine a diagnosis whether said mechanical watch is working properly or not.

9. The system, according to claim 8, wherein the vibration sensor and the processor belong to a diagnosing device which is distinct from the mechanical watch.

10. The system, according to claim 9, wherein said artificial intelligence includes a neural network trained to detect mechanical default in mechanical watches to determine a diagnosis whether said mechanical watch is working properly or not,
   and wherein the diagnosing device further comprises a storage module storing said neural network.

11. The system, according to claim 8, further comprising a server, remote from the vibration sensor, the server comprising the processor.

12. The system according to claim 8, further including the mechanical watch, wherein at least the vibration sensor belongs to the mechanical watch.

13. A mechanical watch comprising:
   a vibration sensor able to acquire at least one vibration signal of the mechanical watch;
   a processor communicating with the vibration sensor and adapted to analyze said at least one vibration signal by an artificial intelligence trained to detect mechanical default in said mechanical watch to determine a diagnosis whether said mechanical watch is working properly or not.

14. The mechanical watch according to claim 13, wherein said artificial intelligence includes a neural network trained to detect mechanical default in said mechanical watch to determine a diagnosis whether said mechanical watch is working properly or not,
   and wherein said mechanical watch further comprises a storage module storing said neural network.

15. The mechanical watch, according to claim 13, further comprising an accelerometer, the vibration sensor being able to acquire the at least one vibration signal of the mechanical watch when a horizontal position and an immobility of the mechanical watch is detected by said accelerometer or to be in a sleep state in which the vibration signal does not acquire any vibration signal.

* * * * *